UNITED STATES PATENT OFFICE.

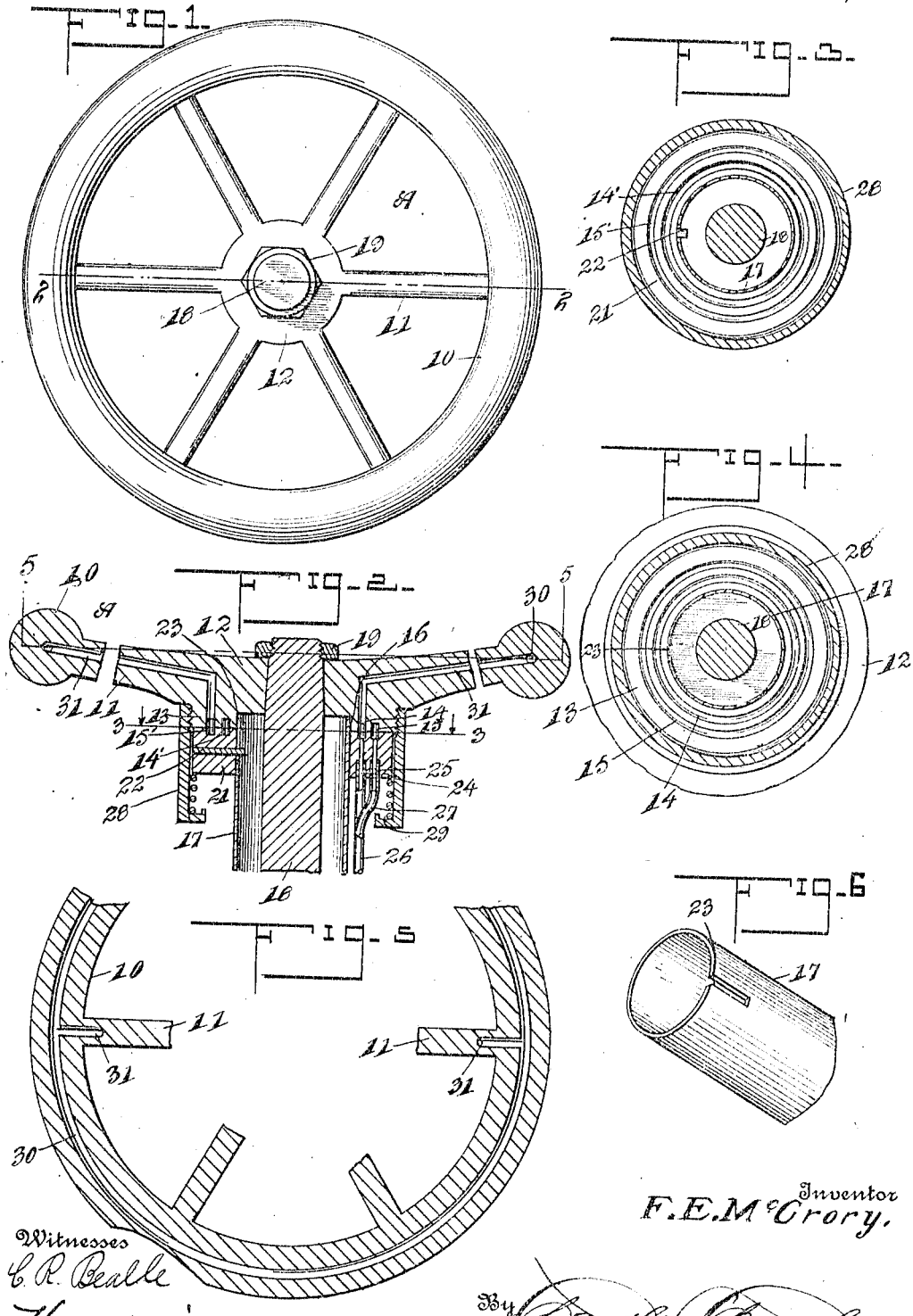

FREDERICK E. McCRORY, OF LOS ANGELES, CALIFORNIA, ASSIGNOR OF ONE-HALF TO JOHN D. PITTS, OF LOS ANGELES, CALIFORNIA.

WARMING DEVICE FOR AUTOMOBILE STEERING-WHEELS.

1,084,890.                     Specification of Letters Patent.        Patented Jan. 20, 1914.

Application filed October 21, 1912. Serial No. 726,975.

*To all whom it may concern:*

Be it known that I, FREDERICK E. MC-CRORY, a citizen of the United States, residing at Los Angeles, in the county of Los Angeles, State of California, have invented certain new and useful Improvements in Warming Devices for Automobile Steering-Wheels; and I do hereby declare the following to be a full, clear, and exact description of the invention, such as will enable others skilled in the art to which it appertains to make and use the same.

This invention relates to warming devices for steering wheels of automobiles, motor boats and the like.

The object of the invention resides in the provision of a structure whereby the exhaust gases of the engine of an automobile, motor boat or the like may be utilized for heating the gripping rim of the steering wheel of the device so as to increase the comfort of the operator in cold weather.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view of the steering wheel and column of an automobile having the invention associated therewith. Fig. 2 a section on the line 2—2 of Fig. 1. Fig. 3 a section on the line 3—3 of Fig. 2. Fig. 4 a view similar to Fig. 3 looking toward the steering wheel. Fig. 5 a section on the line 5—5 of Fig. 2, and Fig. 6 a detail perspective view of the upper end of the steering column.

Referring to the drawings, A indicates a steering wheel which includes a rim 10, spokes 11 and a hub 12. This hub 12 is provided with an exteriorly threaded downward extension 13 and the lower end of this extension is provided with concentrically arranged grooves 14 and 15, the groove 14 being disposed inwardly of the groove 15. The hub extension 13 is provided within the groove 14 with a recess 16 which receives the upper end of the steering column 17. Disposed within the steering column 17 is a steering post 18 which extends through the hub 12 and is secured to the steering wheel by means of a nut 19 threaded on its upper end. Surrounding the column 17 and abutting the lower end of the extension 13 of the hub is a ring 21 and the face of this ring adjacent the lower end of the hub extension 13 is provided with concentrically arranged grooves 14' and 15' which mate respectively with the grooves 14 and 15 in the lower end of the extension 13 and form in conjunction with said grooves 14 and 15 circular channels as will be obvious. Mounted in the ring 21 is a key 22 which projects into a vertical slot 23 formed in the column 17 and which serves to hold the ring 21 against rotation upon said column. The ring 21 is further provided with vertical passages 24 and 25 which communicate at their upper ends with the grooves 14' and 15' respectively and at their lower ends with inlet and outlet pipes 26 and 27 respectively said pipes being suitably secured to the ring 21. The pipe 26, it will be understood is extended and suitably connected with the exhaust of the engine of the automobile with which the steering wheel A is associated, while the pipe 27 is also extended so as to discharge the exhaust gases at a suitable location. Threaded on the extension 13 of the hub 12 is a cap 28 and disposed in said cap with one end bearing against the head thereof and the other end bearing against the ring 21 is a spring 29 which constantly tends to force the ring 21 into engagement with the extension 13 and thereby prevent the escape of gases between the ring and extension 13.

The rim 10 of the steering wheel A is provided with a continuous passage 30, while alined spokes 11 of said steering wheel are provided with passages 31 which communicate at their outer ends with the passage 30 and are extended downwardly at their inner ends so as to communicate respectively with the grooves 14 and 15 in the lower end of the extension 13 of the hub.

In the operation of the device it will be apparent that the exhaust gases from the engine will pass through the pipe 26, passage 24 and thence into the passage formed by the grooves 14 and 14'. The gases will then pass through one of the passages 31 in a spoke of the steering wheel and thence into the passage 30 in the rim of said wheel. The gases thus introduced into the rim 10 will heat the same and afford the necessary warmth thereto to render comfortable the operation of steering the automobile in cold weather. The gases introduced into the passage 30 after circulating freely around the rim will then be discharged into the other passage 31 from where it will pass into the channel formed by the grooves 15 and 15' and thence through the passage 25 and pipe 27 to the atmosphere.

What I claim is:—

The combination of a steering column, a steering post rotatably mounted within the steering column, a steering wheel fixed on the upper end of said steering post for rotation therewith, said steering wheel including a rim, spokes and hub, the rim of said wheel being provided with a continuous passage, and alined spokes thereof being provided with passages communicating with the rim passage at their outer ends, said hub being provided on its lower end with a pair of concentric grooves communicating respectively with the inner ends of the passages in the spokes, a fixed ring surrounding and secured to the steering column and bearing against the lower end of said hub, said ring having its upper end provided with a pair of concentric grooves mating with the respective grooves in the lower end of the hub and forming in conjunction with the latter concentrically arranged passages, said ring being further provided with vertical passages communicating at their upper ends with respective grooves in the upper end of the ring, and inlet and outlet pipes communicating with said vertical passages respectively, said inlet pipe being adapted for connection with the exhaust of an explosive engine.

In testimony whereof, I affix my signature in the presence of two witnesses.

FREDERICK E. McCRORY.

Witnesses:
J. N. HOGG,
C. A. MANN.